US012034243B2

(12) United States Patent
Kliever

(10) Patent No.: US 12,034,243 B2
(45) Date of Patent: Jul. 9, 2024

(54) CONTACT CARRIER FOR CRIMP CONTACTS

(71) Applicant: HARTING Electric Stiftung & Co. KG, Espelkamp (DE)

(72) Inventor: Wilhelm Kliever, Minden (DE)

(73) Assignee: HARTING Electric GmbH & Co. KG, Espelkamp (DE)

(*) Notice: Subject to any disclaimer, the term of this patent is extended or adjusted under 35 U.S.C. 154(b) by 375 days.

(21) Appl. No.: 17/612,598

(22) PCT Filed: May 6, 2020

(86) PCT No.: PCT/DE2020/100376
§ 371 (c)(1),
(2) Date: Nov. 19, 2021

(87) PCT Pub. No.: WO2020/233740
PCT Pub. Date: Nov. 26, 2020

(65) Prior Publication Data

US 2022/0239031 A1 Jul. 28, 2022

(30) Foreign Application Priority Data

May 21, 2019 (DE) .................... 10 2019 113 494.3

(51) Int. Cl.
*H01R 13/436* (2006.01)
*H01R 4/2495* (2018.01)
(Continued)

(52) U.S. Cl.
CPC ....... *H01R 13/4368* (2013.01); *H01R 4/2495* (2013.01); *H01R 13/4226* (2013.01); *H01R 13/506* (2013.01); *H01R 43/20* (2013.01)

(58) Field of Classification Search
None
See application file for complete search history.

(56) References Cited

U.S. PATENT DOCUMENTS

| | | | | |
|---|---|---|---|---|
| 4,900,271 | A | 2/1990 | Colleran et al. | |
| 5,035,648 | A * | 7/1991 | Kuiper-Moore | H01R 13/424 439/752 |

(Continued)

FOREIGN PATENT DOCUMENTS

| | | | |
|---|---|---|---|
| CN | 101047303 | A | 10/2007 |
| CN | 104170179 | A | 11/2014 |

(Continued)

*Primary Examiner* — Oscar C Jimenez
(74) *Attorney, Agent, or Firm* — Smartpat PLC

(57) ABSTRACT

A contact carrier receives and fixes at least one crimp contact. The contact carrier includes an insulating body and a holding plate that can be mounted on the insulating body on a connection side. The insulating body has a detent element which, in the non-mounted state, can assume both a position in which the crimp contact is latched and a position in which the crimp contact is unlatched. The holding plate has a locking element which, in the mounted state, fixes the at least one detent element in its position in which the crimp contact is latched. It thereby prevents the crimp contact from moving from the latching position to the unlatching position. The detent element is designed as a detent arm which points towards the connection side and has a detent molding for latching in a latching groove of the crimp contact.

5 Claims, 4 Drawing Sheets

(51) Int. Cl.
*H01R 13/422* (2006.01)
*H01R 13/506* (2006.01)
*H01R 43/20* (2006.01)

(56) References Cited

U.S. PATENT DOCUMENTS

| | | | | | |
|---|---|---|---|---|---|
| 5,490,802 | A * | 2/1996 | Plyler | H01R 13/4368 | 439/752 |
| 5,830,013 | A * | 11/1998 | Saito | H01R 13/4362 | 439/752 |
| 5,960,540 | A * | 10/1999 | Pentz | H01R 43/16 | 29/33 M |
| 6,065,999 | A * | 5/2000 | Radliff | H01R 13/64 | 439/595 |
| 6,713,711 | B2 * | 3/2004 | Conway | H05H 1/3423 | 219/121.48 |
| 7,351,117 | B1 * | 4/2008 | Mostoller | H01R 13/506 | 439/744 |
| 9,960,515 | B2 * | 5/2018 | Uenosono | H01R 13/4223 | |
| 11,128,081 | B2 * | 9/2021 | Yang | H01R 13/506 | |
| 11,336,047 | B2 * | 5/2022 | Kliever | H01R 13/4364 | |
| 11,355,886 | B2 * | 6/2022 | Kliever | H01R 13/4226 | |
| 11,495,904 | B2 * | 11/2022 | Kliever | H01R 13/426 | |
| 2004/0067686 | A1 | 4/2004 | Nimura | | |
| 2004/0192108 | A1 | 9/2004 | Ward et al. | | |
| 2014/0295690 | A1 | 10/2014 | Quero et al. | | |
| 2017/0125949 | A1 | 5/2017 | Saur et al. | | |
| 2018/0019532 | A1 | 1/2018 | Uenosono et al. | | |
| 2018/0351280 | A1 | 12/2018 | Kosmalski et al. | | |

FOREIGN PATENT DOCUMENTS

| | | | | |
|---|---|---|---|---|
| CN | 104916976 | A | 9/2015 | |
| CN | 106463889 | A | 2/2017 | |
| CN | 107623225 | A | 1/2018 | |
| CN | 108988004 | A | 12/2018 | |
| DE | 69032353 | | 10/1998 | |
| DE | 102017211983 | A1 | 1/2018 | |
| DE | 102018124197 | A1 * | 4/2020 | H01R 13/4226 |
| FR | 2337949 | B1 | 8/1977 | |

* cited by examiner

CONTACT CARRIER FOR CRIMP CONTACTS

TECHNICAL FIELD

The disclosure relates to a contact carrier for receiving and fixing at least one crimp contact and to a method of mounting a crimp contact in a contact carrier.

BACKGROUND

Contact carriers are used to hold at least one plug contact inserted therein and at the same time to absorb the mating forces acting thereon during the mating process. The plug contact can have a cable connection region on the connection side, specifically a crimp connection. In this case, the plug contact is a crimp contact. On the mating side, the plug contact can have a mating region, for example a contact pin or a contact socket. Furthermore, the plug contact can have a detent groove arranged between the mating region and the cable connection region.

In the prior art, single- and multi-part contact carriers for receiving and holding crimp contacts are generally known.

For fixing the above-mentioned crimp contacts, latching methods are known, in which a contact carrier holds such a crimp contact at its circumferential detent groove against occurring mating forces. The detent groove is rectangular in cross-section, i.e. it has two opposing detent surfaces which are oriented at right angles to the mating direction/axis of symmetry of the plug contact.

A disadvantage is that, due to the space required in the contact carrier, only crimp contacts designed for the connection of electrical conductors with a cross-sectional area of up to 4 $mm^2$ can be used in the current prior art. However, these crimp contacts are already available on the market in large quantities and should continue to be used, in particular also because of their excellent long-term behavior, which has been tested in practice. For this reason, customers are demanding contact carriers that can be used both for the above-mentioned crimp contacts and for crimp contacts for larger conductor cross-sections, for example for conductor cross-sections up to 10 $mm^2$.

The German Patent and Trademark Office has searched the following prior art in the priority application for the present application: DE 10 2017 211 983 A1, DE 690 32 353 T2 and FR 2 337 949 A1.

SUMMARY

An object of the disclosure is to design a contact carrier of the type mentioned at the outset, in such a way that it is designed for the largest possible conductor cross-sections, for example of up to 10 $mm^2$ cross-sectional area. This object is achieved by the features of the independent claims.

A contact carrier is used to hold and fix at least one crimp contact. The contact carrier has a mating side for connecting to a mating connector on the mating side and, opposite to this, a connection side for inserting a cable on the connection side. Furthermore, the contact carrier is of an at least two-part design and has an insulating body and a holding plate which can be mounted on said insulating body on the connection side. The insulating body has at least one detent element which, in the non-mounted state, can assume both a position latching the crimp contact and a position not latching crimp contact. The holding plate has at least one locking element which, in the mounted state, fixes the at least one detent element in its position latching the crimp contact and in this way prevents said detent element from transitioning from the latching position to the non-latching position. The detent element is designed as at least one detent arm pointing in the direction of the connection side and has a detent molding for latching in a detent groove of the crimp contact.

The term "on the connection side" is understood here and in the following to mean on the cable connection side, i.e. on the relevant cable connection side and/or inclined or oriented at least in the direction of the relevant cable connection side. The term "connection side" thus refers basically to the cable connection side.

Advantageous embodiments of the invention are given in the dependent claims.

An additional advantage of the contact carrier is that it can also be used for certain crimp contacts already on the market that are designed for electrical conductors with cross-sectional areas of up to 4 $mm^2$.

The contact carrier has the holding plate and the insulating body. The at least one detent arm is part of the insulating body. The detent arm can have an inner detent flange as a detent molding. This inner detent flange serves to engage interlockingly in the circumferential detent groove of the crimp contact for particularly stable latching.

The holding plate also has at least one locking element which, in the mounted state, fixes the at least one detent arm in its position latching the crimp contact and thus prevents said detent arm from transitioning from the latching position to the non-latching position. In the mounted state, the locking element can be inserted between the detent arm and an inner side of a preferably cylindrical through-opening of the insulating body in a frictionally engaged manner and, in particular, also in an interlocking manner. The detent arm is thus locked in its latching state.

The locking element can be a locking sleeve or at least one sleeve segment. This is particularly advantageous because the locking element can thus be inserted not only in a frictionally engaged manner but also, in particular, interlockingly between the at least one, preferably hollow-cylindrical segment-like detent arm on the one hand and the inner side of a preferably cylindrical through-opening of the insulating body.

The insulating body preferably has at least two, in particular at least three, for example at least four detent arms for latching the inserted crimp contact against movement in the mating direction. Here, "in the mating direction" means both in the direction of the mating side and in the direction of the connection side, thus specifying the direction in the sense of an axis of movement, but not the orientation of the movement vector.

To facilitate mounting, in a preferred embodiment the holding plate can be latched to the insulating body in two different positions, specifically in a loading position and a locking position. In the loading position, the crimp contact can be inserted into the contact carrier on the connection side and latched. The locking position, on the other hand, corresponds to the mounted state, in which the detent element is fixed, by the locking element, in its position latching the crimp contact in the mating direction and thus the crimp contact is finally held stable in the contact carrier.

For this purpose, the holding plate can further have at least one fastening plate with two detent windows, specifically a first detent window and a second detent window. The insulating body may have externally at least two detent pins corresponding thereto, specifically at least one first detent pin and at least one second detent pin. The holding plate is in the loading position when the at least one fastening plate latches with its first detent window on the second detent pin. The holding plate is in its locking position when the first detent window latches on the first detent pin and the second detent window latches on the second detent pin. In this way, particularly convenient operability is ensured for the mounting by simple means.

The holding plate can have a rectangular base plate which has at least one insertion opening for inserting the at least one crimp contact. On each of two opposite sides of the base plate, there may be arranged one of the fastening plates molded at right angles on the base plate and running in the mating direction. These two fastening plates then point in the same direction as the at least one locking element.

A method for mounting a crimp contact in such a contact carrier is characterized by the following steps:

A. latching the holding plate in its loading position on the insulating body;
B. inserting at least one crimp contact, crimped on the connection side with a stranded electrical conductor, into the insulating body;
C. releasably latching the at least one crimp contact by means of its circumferential detent groove on the at least one detent arm;
D. moving the holding plate from its loading position to its final locking position;
E. fixing the at least one detent arm in its latching position by the locking element of the holding plate;
F. holding the at least one crimp contact in a particularly stable manner in the contact carrier and absorbing high mating forces acting on the at least one crimp contact by the insulating body.

The method is of particular advantage because the at least one crimp contact may in this way latch to the insulating body instead of to the holding plate. For its part, the mounted holding plate merely ensures, by means of the locking element, that the at least one detent arm of the insulating body is fixed in its position latching the crimp contact. At the same time, the holding plate itself does not absorb any mating forces. As a result, the contact carrier can absorb the forces occurring during the mating process particularly effectively, because the holding plate is relieved of the mating forces naturally acting in the direction of the connection side—and thus in its direction of demounting.

Lastly, the design of the contact carrier makes it possible to use both crimp contacts with crimp cross sections of up to 4 $mm^2$ that already exist on the market and new crimp contacts that are capable of accommodating cable cross sections of up to 10 $mm^2$. The latter is made possible in particular by the fact that the detent element is designed as at least one detent arm pointing in the direction of the connection side. Lastly, this creates enough space in the connection region of the contact carrier to accommodate cables with these relatively large cross-sectional areas. For this reason, the use of a circumferential detent groove of the crimp contact is particularly advantageous, because the at least one detent arm can also hold the contact in this orientation at its circumferential detent groove with a high holding force in both the connection-side and mating-side directions.

In a preferred embodiment, the insulating body can have a cuboidal basic shape with a preferably substantially cylindrical through-opening which extends from the connection side to the mating side, i.e. the axis of symmetry of which may run in the mating direction. The detent arm is molded on the inner side of the through-opening and projects into the through-opening for latching the crimp contact, in particular with the detent flange molded thereon on the inner side. Preferably, the insulating body has at least two such detent arms. In a further embodiment, at least three, in particular at least four, detent arms or more are molded on the inner side of the relevant through-opening of the insulating body for each crimp contact, wherein all detent arms point in the direction of the connection side. By using a large number of detent arms, the mating and extraction forces can be absorbed even more evenly by the insulating body.

In particular, the insulating body thus has at least two, in particular at least three, preferably at least four, that is to say for example two, three, four, five, . . . , n detent arms for latching each inserted crimp contact to its circumferential detent groove and thus for preventing movement of the relevant crimp contact in the direction of the connection side of the contact carrier as well as in the opposite direction.

In another preferred embodiment, the holding plate itself can be latched to the insulating body in two different positions, specifically in a loading position and a locking position. In the loading position, the crimp contact can be inserted into the contact carrier on the connection side and initially latched to the detent element. The locking position corresponds to the mounted state, in which the crimp contact is finally held stable in the contact carrier. In this mounted state (locking position), the contact carrier can thus absorb particularly high mating forces.

As already mentioned, for this purpose, the holding plate may have the two said fastening plates which are arranged on two opposite sides of the base plate at right angles thereto. For the purpose of the aforementioned multi-stage latching, detent elements, in particular the two detent windows, specifically the first detent window and the second detent window, can be arranged on each fastening plate. On each of two opposite outer sides, the insulating body can have an outwardly open recess adjoining the connection side and running in the direction of the mating side, which recesses are bounded by two outer ribs. Each of the fastening plates of the holding plate can then be inserted into a corresponding recess, in particular with an exact fit between the ribs, for mounting the contact carrier. In the region of the recess, two detent pins, specifically a first and a second detent pin, are arranged on the outer side of the insulating body, corresponding to the detent windows of the fastening plates and offset from one another in the mating direction. Of course, differently designed detent means are also conceivable. For example, in a further embodiment, the fastening plates could have detent moldings, and detent recesses corresponding thereto could be arranged on the insulating body, which perform a comparable function.

In a particularly preferred embodiment, the mounting of the contact carrier with the crimp contact can take place as follows:

When the fastening plates of the holding plate are inserted into the recesses of the insulating body, the first detent pin of the insulating body in each case first latches in the second detent window of the relevant fastening plate. In this state, the holding plate is in its loading position on the insulating body.

The crimp contact, which is for example a pin contact or socket contact, can be crimped on the connection side with a stranded electrical conductor of an electrical cable. The crimp contact provided with the cable can then be inserted with its mating region first through the insertion opening of the holding plate into the through-opening of the insulating body and latched into its final position in the insulating body by the at least one detent arm. For latching, the detent arms engage with their inner flange in the circumferential detent groove of the crimp contact. This fixes the crimp contact both in the direction of the mating region and in the direction of the connection region.

Now the holding plate is moved from its loading position to its final locking position. The contact carrier is thus finally mounted and the crimp contact is fixed in its final position in the contact carrier with the desired high holding force. For this purpose, the locking element is arranged between the detent arms and the inside of the through-opening. In this way, the locking element prevents an outwardly directed movement of the detent arms, i.e. a movement towards the inner side of the through-opening. The detent arms are thus blocked against a transition to their non-latching position. The crimp contact cannot push the detent arms apart, not even under the action of particularly high mating forces. It is therefore held particularly stable in the contact carrier. If necessary, the high mating forces are absorbed by the insulating body, on which the detent arms are finally arranged. Thus, the holding plate also does not experience any forces that unlock/demount it.

The locking element can be a locking sleeve or a plurality of sleeve-shaped segments.

If it is ever necessary to subsequently remove the already mounted crimp contact, an unlocking tool is provided. First, the holding plate can be brought into its assembly state so that the detent arms can be unlocked. Then, they can be pressed apart with a hollow-cylindrical unlocking portion of the unlocking tool. For this purpose, on the one hand, it is advantageous if the detent arms are tapered at their free ends. It is furthermore also advantageous if the cylinder wall of the hollow-cylindrical unlocking portion also tapers to a point towards the free end of the detent arm. Then, by inserting the unlocking tool on the connection side, unlocking can take place and the crimp contact can be pulled out of the contact carrier by the cable crimped to the crimp contact.

For the sake of completeness, it should be mentioned that the need for an unlocking tool could be avoided if the circumferential detent groove of the crimp contact did not have parallel detent surfaces in cross-section, but instead had oblique, i.e. non-parallel, detent surfaces that opened outwards and if, in particular, the inner detent flange of the locking arms were also designed to taper outwardly. In this case, the crimp contact would still be secured by the locking element in the mounted state, but could also be unlatched in the loading state, also without an unlocking tool, with a certain amount of force, for example by pulling on the cable. However, this is not desired in the preferred embodiment, since, in accordance with the above-mentioned specification, the crimp contacts already existing on the market with crimp connections of up to 4 $mm^2$ are also to be used and their circumferential detent groove ultimately has a rectangular cross-section.

In general, a subsequent demounting is rather unusual in any case. Stability and operational safety, on the other hand, should definitely be given preference.

BRIEF DESCRIPTION OF THE DRAWINGS

An exemplary embodiment is shown in the drawings and is explained in more detail below.

DETAILED DESCRIPTION

The figures contain partially simplified, schematic representations. In part, identical reference signs are used for the same, but possibly not identical elements. Different views of the same elements may be scaled differently.

Figure 1A:
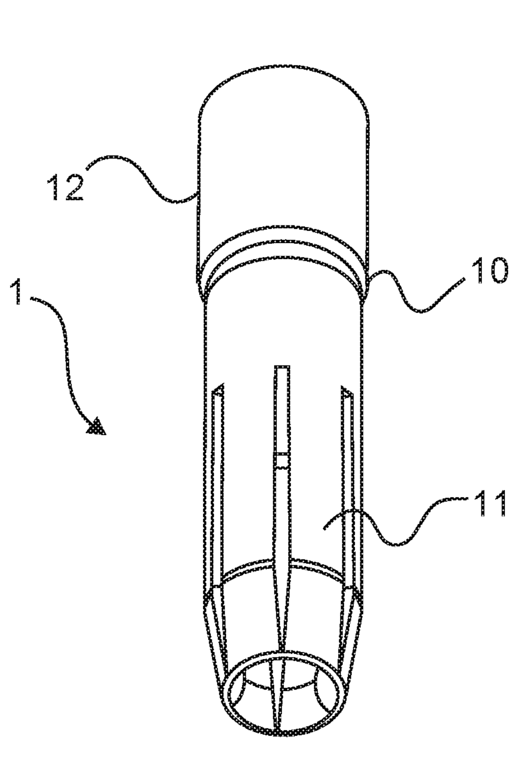
FIGS. 1*a-b* show a crimp contact in two different views.
Figure 1B:
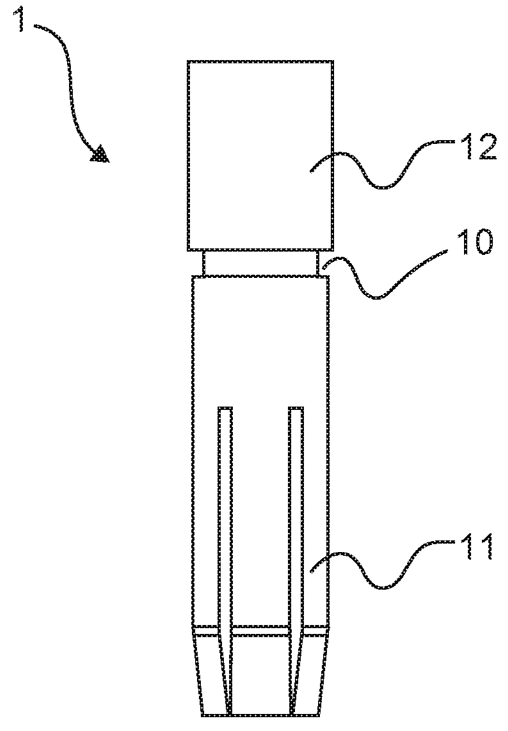

FIGS. 1*a* and 1*b* show a crimp contact 1 designed as a socket contact. Its mating region 11 is thus formed by a contact socket and is hollow-cylindrical for this purpose and segmented by a plurality of slots. Its connection region 12 is designed as a crimp connection for connecting an electrical conductor, for example the stranded wire of an electrical cable. Between the connection region 12 and the mating region 11, the crimp contact 1 has a circumferential detent groove 10.

FIGS. 2*a* to 2*d* show an insulating body 2 with a plurality of through-openings 20 provided as contact receptacles. This insulating body 2 has two recesses 28 of rectangular cross-section on two opposite outer narrow sides. Each of the two recesses 28 is bounded by two lateral ribs 29. Two detent pins 284, 284', specifically a first detent pin 284 and a second detent pin 284', are arranged in these two recesses 28 offset relative to one another in the direction of insertion. These each have a slide-on slope which, for reasons of clarity, is not provided with a reference sign.

Furthermore, the insulating body has a plurality of hollow-cylindrical mating portions 21 on the mating side S, through each of which one of the through-openings 20 extends.

Figure 2A:
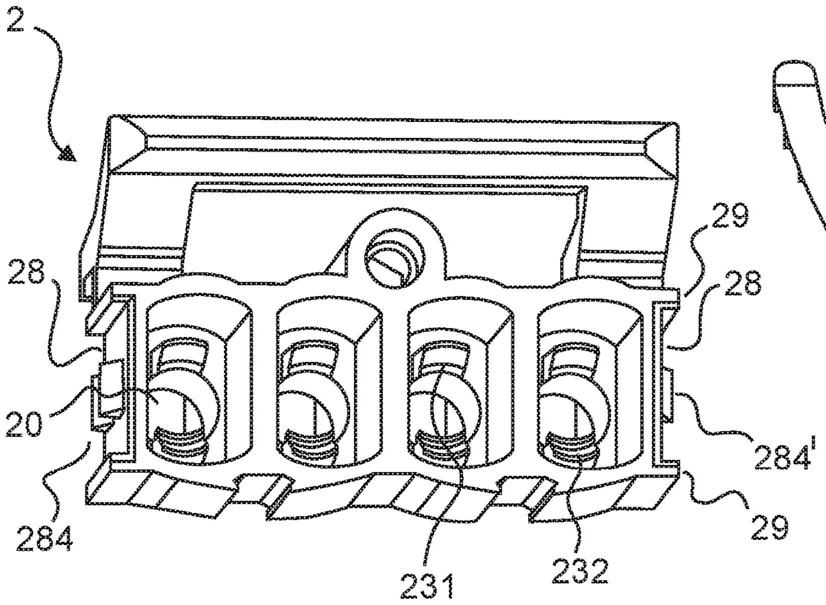
FIGS. 2*a-d* show an insulating body in different views and in a sectional view.
Figure 2B:
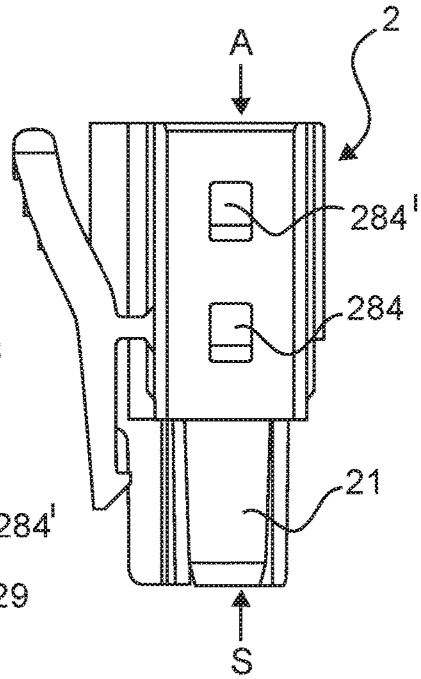
Figure 2C:
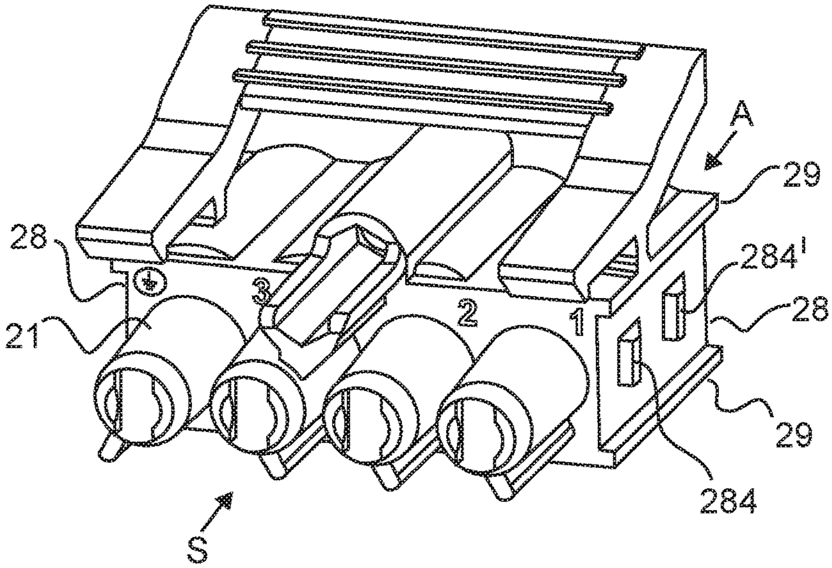

Within each through-opening 20, two detent arms 232 are arranged opposite each other, pointing in the direction of the connection side A (i.e. in the direction of the cable connection side). As shown in FIG. 2*a*, these detent arms 232 have a basic shape similar to a hollow-cylinder segment. On the inside, a detent flange 231 projecting into the through-opening 20 is molded on this basic shape for fixing the relevant crimp contact 1 at its circumferential detent groove 10.

Figure 2D:
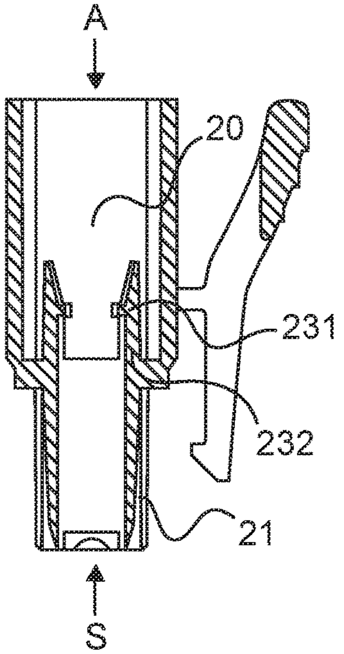

FIG. 2*d* shows particularly well that the detent arms 232, coming exclusively from the direction of the mating side S, point with their free end in the direction of the connection side A. This creates a particularly large amount of space in the connection region, since this is free of detent arms 232 or parts thereof. Thus, crimp contacts 1 with particularly large connection regions/crimping regions 12 and electrical conductors/cables with particularly large cross sections can be used.

Figure 3A:
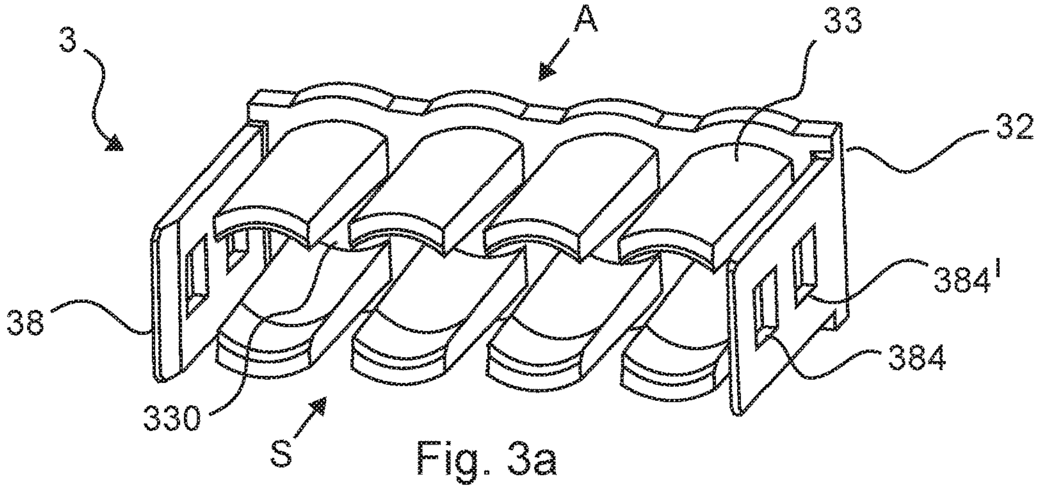
FIGS. 3*a-c* show a holding plate from different angles.
Figure 3B:
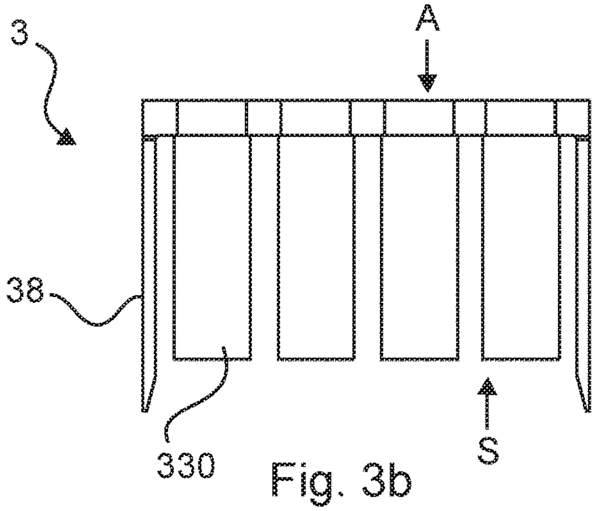
Figure 3C:
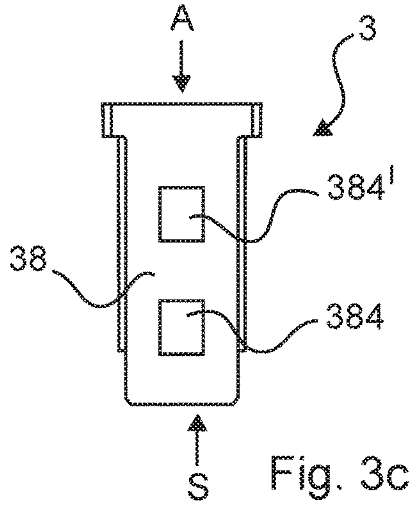
Figure 3D:
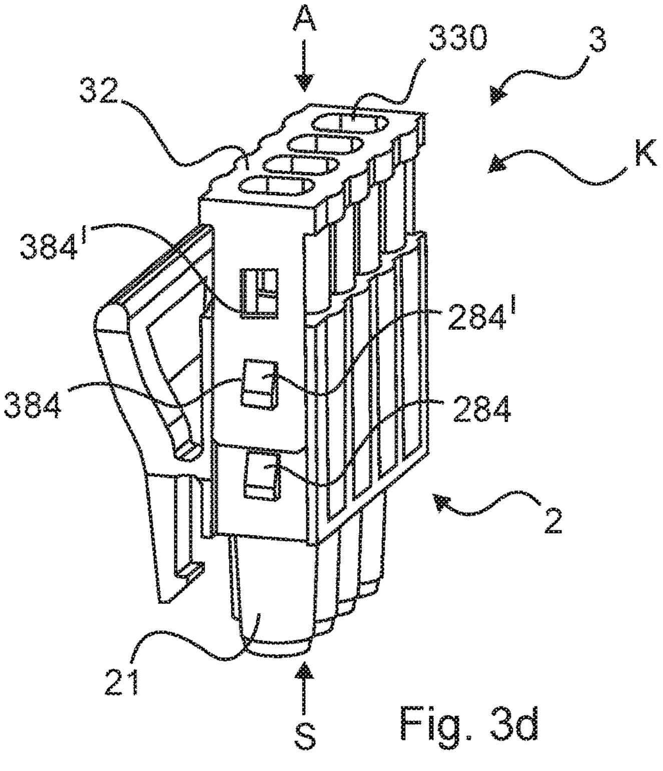
FIG. 3*d* show a contact carrier in the loading state from the outside.

FIGS. 3*a* to 3*c* show a holding plate 3 as an individual part from several different perspectives. FIG. 3*d* shows the holding plate 3 together with the insulating body 2 in its loading position. Here, the holding plate 3 and the insulating body 2 together form the contact carrier K.

The holding plate 3 has a rectangular base plate 32 with a plurality of insertion openings 330, which can be seen particularly well in FIG. 3*d* from the direction of the connection side A. These insertion openings 330 serve to insert the crimp contacts 1 during the mounting process. Two hollow-cylinder segment-like locking elements 33, which project at right angles from the base plate 32, adjoin each insertion opening 330 opposite one another.

On each of two opposite narrow sides of the base plate 32, a fastening plate 38 is molded at right angles to the base plate 32. For multi-stage latching, two detent windows 384, specifically a first detent window 384 and a second detent window 384', are arranged on each fastening plate 38. For the construction of the contact carrier K, the fastening plates 38 can be pushed into the recesses 28 of the insulating body 2, in particular with an exact fit between the lateral ribs 29, wherein the detent windows 384, 384' can latch on the detent pins 284, 284'. At the same time, the locking elements 33 can be inserted into the corresponding through-openings 20.

Figure 4A:
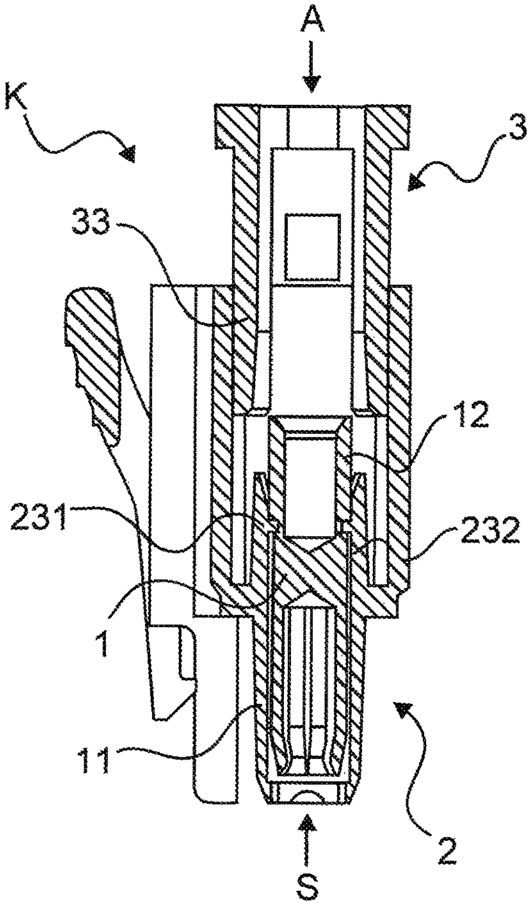
FIGS. 4*a-b* show a sectional view in the loading state and in the mounted state.

FIG. 3*d* shows the contact carrier K, which has the insulating body 2 and the holding plate 3 latched thereto in a loading position, whereby the contact carrier K is in a loading state. FIG. 4*a* shows the same arrangement in cross-section. In this loading state of the contact carrier K, the crimp contact 1 can be inserted into the contact carrier K from the connection side A. Usually, the crimp contact 1 is crimped previously at its crimp connection 12 with a stranded electrical conductor, not shown in the drawing.

In the loading state, the first detent windows 384 of the holding plate 3 latch on the second detent pins 284' of the insulating body 2. In this state, the locking elements 33 are only partially inserted into the through-opening 20 and in this position do not yet lock the detent arms 232 against movement into their unlatching position. In this state, the crimp contact 1 can be inserted into the contact carrier K from the direction of the connection side A.

Figure 4B:
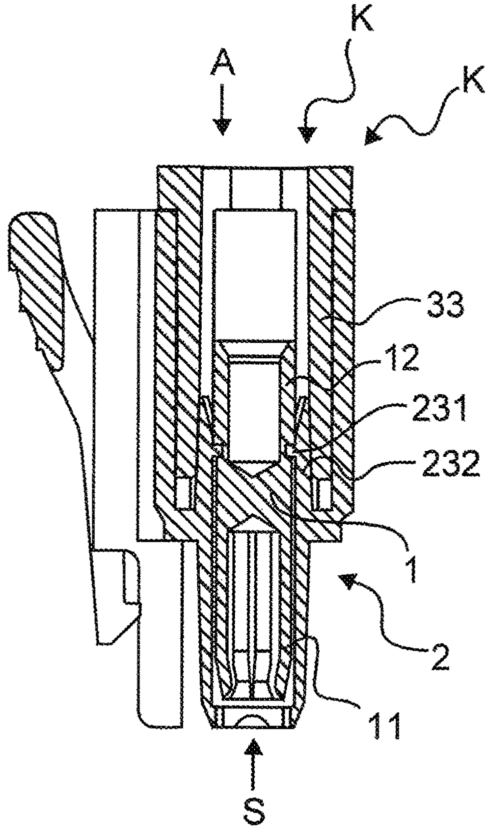

A further movement of the holding plate 3 in the mating direction, i.e. in the direction of this mating side S, causes the first detent window 384 to latch on the first detent pin 284 and the second detent window 384' to latch on the second detent pin 284'. The holding plate 3 then assumes a position relative to the insulating body 2 as shown in FIG. 4*b*. The holding plate 3 is thus in its locking position. The detent arms 232 are now prevented by the locking elements 33 from performing an unlatching movement. The contact carrier K is then disposed, together with the inserted crimp contact 1, in its mounted state, in which the crimp contact 1 is fixed in the contact carrier 3 with particularly high holding forces both against movement in the direction of the connection side A and against movement in the direction of the mating side S.

Figure 5A:
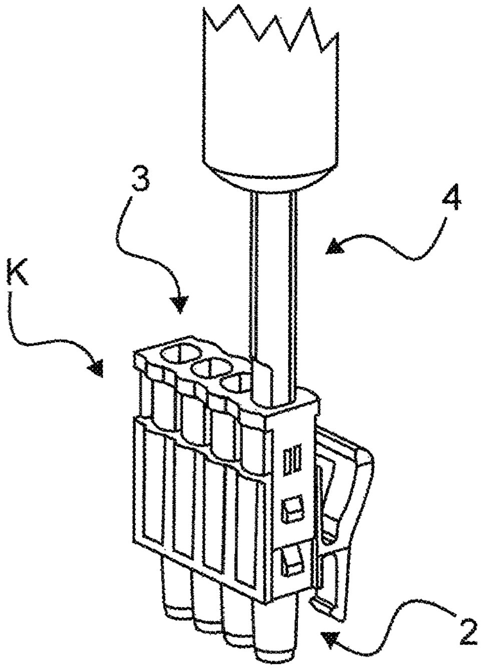
FIGS. 5*a-b* show the contact carrier in the loading state with an unlocking tool.
Figure 5B:
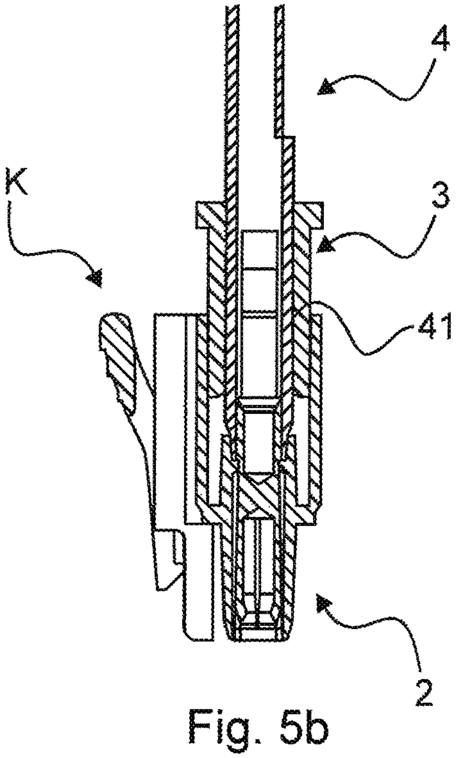

FIGS. 5*a* and 5*b* show an unlocking operation by means of an unlocking tool 4. The contact carrier K is in its mounted state. At its free end, the unlocking tool 4 has a hollow-cylindrical unlocking portion 41, the diameter of which corresponds to the distance between the opposite detent pins 232 and the outer wall of which is tapered at the end, specifically flattened inwardly. Advantageously, the detent pins 232 are also tapered towards their end, specifically flattened outwardly. The depth of the detent flange 231 does not exceed the width of the outer wall of the unlocking portion 41 of the unlocking tool 4. Thus, the crimp contacts 1 can be unlatched from the detent arms 232 by inserting the unlocking tool 4 into the relevant insertion opening 330.

Even though various aspects or features of the invention are each shown in the figures in combination, it is apparent to those skilled in the art—unless otherwise indicated—that the combinations shown and discussed are not the only possible ones. In particular, corresponding units or feature complexes from different exemplary embodiments can be interchanged.

LIST OF REFERENCE SIGNS

1 crimp contact
10 circumferential detent groove
11 mating region, contact socket
12 connection region, crimp connection
2 insulating body
20 through-opening
21 mating portion
231 inner detent flange
232 detent element, detent arm
284, 284' first, second detent pin
3 holding plate
32 base plate
33 locking element
330 insertion openings
38 fastening plate
384, 384' first, second detent window
4 unlocking tool
41 unlocking contour
K contact carrier
A connection side
S mating side

The invention claimed is:

1. A contact carrier (K) for receiving and fixing at least one crimp contact (1), wherein the contact carrier (K) has a mating side (S) and, opposite thereto, a connection side (A), and wherein the contact carrier (K) is of at least a two-part design and comprises an insulating body (2) and a holding plate (3) which can be mounted on the connection side to the insulating body (2), wherein the insulating body (2) has at least one detent element (232) which, in a non-mounted state, can assume both a position latching the crimp contact (1) and a position unlatching the crimp contact (1), wherein the holding plate (3) has a locking element (33) which, in a mounted state, fixes the at least one detent element (232) in its position latching the crimp contact (1) and thereby prevents the detent element from transitioning from the latching position to the unlatching position, wherein the detent element is at least one detent arm (232) which points towards the connection side (A) and has a latching projection (231) for latching in an inwardly recessed detent groove (10) of the crimp contact (1), wherein, in the mounted state, the locking element (33) is arranged in a frictionally engaged manner between the at least one detent arm (232) and an inner side of a through-opening (20) of the insulating body (2), wherein the locking element is a locking sleeve (33) or at least one sleeve segment (33'), wherein the at least one detent arm (232) is hollow-cylindrical segment-like, and wherein the latching projection (231) is formed by an inner-side detent flange (231), with which the at least one detent arm (232) projects into an interior of the through-opening (20) of the insulating body (2), and wherein the inner-side detent flange (231) serves to engage interlockingly in the inwardly recessed detent groove (10) of the crimp contact (1) for latching.

2. The contact carrier (K) as claimed in claim 1, wherein the insulating body (2) has at least two detent arms (232) for latching the crimp contact (1) against movement in an insertion direction.

3. The contact carrier (K) as claimed in claim 1, wherein the holding plate (3) can be latched on the insulating body (2) in two different positions, namely in a loading position and a locking position, wherein in the loading position the crimp contact (1) can be inserted and latched into the contact carrier (K) on the connection side (A), and wherein the locking position corresponds to the mounted state, in which the detent arm (232) is fixed, by the locking element (33), in its position latching the crimp contact (1) and thereby the crimp contact (1) is held stable in the contact carrier (K).

4. A contact carrier (K) for receiving and fixing at least one crimp contact (1), wherein the contact carrier (K) has a mating side (S) and, opposite thereto, a connection side (A), and wherein the contact carrier (K) is of at least a two-part design and comprises an insulating body (2) and a holding plate (3) which can be mounted on the connection side to the insulating body (2), and wherein the insulating body (2) has at least one detent element (232) which, in a non-mounted state, can assume both a position latching the crimp contact (1) and a position unlatching the crimp contact (1), and wherein the holding plate (3) has at least one locking element (33) which, in a mounted state, fixes the at least one detent element (232) in its position latching the crimp contact (1) and thereby prevents the detent element from transitioning from the latching position to the unlatching position, and wherein the detent element is at least one detent arm (232) which points towards the connection side (A) and has a latching projection (231) for latching in an inwardly recessed detent groove (10) of the crimp contact (1), and wherein the holding plate (3) can be latched on the insulating body (2) in two different positions, namely in a loading position and a locking position, and wherein in the loading position the crimp contact (1) can be inserted and latched into the contact carrier (K) on the connection side (A), and wherein the locking position corresponds to the mounted state, in which the detent arm (232) is fixed, by the locking element (33), in its position latching the crimp contact (1) and thereby the crimp contact (1) is held stable in the contact carrier (K), and wherein the holding plate (3) has at least one fastening plate (38) with two detent windows (384, 384'), namely a first detent window (384) and a second detent window (384'), and wherein the insulating body (2) has externally at least two detent pins (284, 284') corresponding thereto, namely at least one first detent pin (284) and at least one second detent pin (284'), and wherein the holding plate (3) is in the loading position when the at least one fastening plate (38) latches with its first detent window (384) on the second detent pin (284'), and wherein the holding plate (3) is in its locking position when the first detent window (384) latches on the first detent pin (284) and the second detent window (384') latches on the second detent pin (284').

5. The contact carrier (K) as claimed in claim 4, wherein the holding plate (3) has a rectangular base plate (32) with an insertion opening (330) for inserting the crimp contact (1), and wherein a fastening plate (38) running at right angles to the rectangular base plate (32) is arranged on each of two opposite sides of the rectangular base plate (32), and wherein these two fastening plates (38) point in the same direction as the at least one locking element (33).

* * * * *